United States Patent
Roa-Espinosa

(10) Patent No.: US 9,249,039 B1
(45) Date of Patent: Feb. 2, 2016

(54) WATER SEPARATION FROM SLUDGE

(71) Applicant: Aicardo Roa-Espinosa, Madison, WI (US)

(72) Inventor: Aicardo Roa-Espinosa, Madison, WI (US)

(*) Notice: Subject to any disclaimer, the term of this patent is extended or adjusted under 35 U.S.C. 154(b) by 0 days.

(21) Appl. No.: 14/607,041

(22) Filed: Jan. 27, 2015

(51) Int. Cl.
| | |
|---|---|
| C02F 1/52 | (2006.01) |
| B01D 21/01 | (2006.01) |
| B01D 35/00 | (2006.01) |
| B01J 20/00 | (2006.01) |
| C02F 11/12 | (2006.01) |
| C02F 1/54 | (2006.01) |
| C02F 1/56 | (2006.01) |
| B01D 21/00 | (2006.01) |
| B03D 3/00 | (2006.01) |
| C02F 1/00 | (2006.01) |
| B01D 37/00 | (2006.01) |
| B01D 24/00 | (2006.01) |
| B01D 17/00 | (2006.01) |
| B01D 21/02 | (2006.01) |

(52) U.S. Cl.
CPC ............... *C02F 11/12* (2013.01); *B01D 21/01* (2013.01); *C02F 1/5227* (2013.01); *C02F 1/5245* (2013.01); *C02F 1/54* (2013.01); *C02F 1/56* (2013.01); *B01D 21/02* (2013.01); *C02F 2209/02* (2013.01)

(58) Field of Classification Search
None
See application file for complete search history.

(56) References Cited

U.S. PATENT DOCUMENTS

| | | | | |
|---|---|---|---|---|
| 3,839,202 A | * | 10/1974 | Roy | C02F 1/688 210/732 |
| 3,860,526 A | * | 1/1975 | Corbett | C02F 1/54 210/733 |
| 4,174,291 A | * | 11/1979 | Benjamin | C02F 1/52 510/108 |
| 5,449,453 A | * | 9/1995 | Tang | B01D 24/008 210/108 |
| 5,717,023 A | * | 2/1998 | Batty | C02F 1/5227 210/734 |
| 2006/0039841 A1 | * | 2/2006 | Rico | A01N 37/16 422/305 |
| 2006/0102874 A1 | * | 5/2006 | Zheng | C02F 1/688 252/182.11 |
| 2012/0132586 A1 | * | 5/2012 | Smith | C02F 11/04 210/603 |
| 2013/0270189 A1 | * | 10/2013 | Allen | C02F 9/00 210/652 |
| 2014/0124454 A1 | * | 5/2014 | Nichols | C02F 1/5272 210/732 |

FOREIGN PATENT DOCUMENTS

GB          2386117 A  *  9/2003  ............... C02F 9/00

* cited by examiner

*Primary Examiner* — Nam Nguyen
*Assistant Examiner* — Clare Perrin
(74) *Attorney, Agent, or Firm* — Steven H. Greenfield; Greenfield Invention and Patent Consulting, Inc.

(57) ABSTRACT

A process for separating a sludge stream containing particulate matter into a stream containing predominantly clarified water and a stream containing predominantly particulate matter is disclosed. The process involves passing the sludge stream through a solid reagent contactor bed composed of solid reagent tablets having a copolymer composition for particle aggregation as described in U.S. Pat. No. 8,076,391. The dissolution of the solid reagent tablets into the sludge stream treats the sludge and makes it amenable for the speedy settling of concentrated sludge at the bottom of a sludge concentrator tank leaving a relatively clean water phase to rise to the top. The process is particularly useful for recovering water from mining sludge.

13 Claims, 3 Drawing Sheets

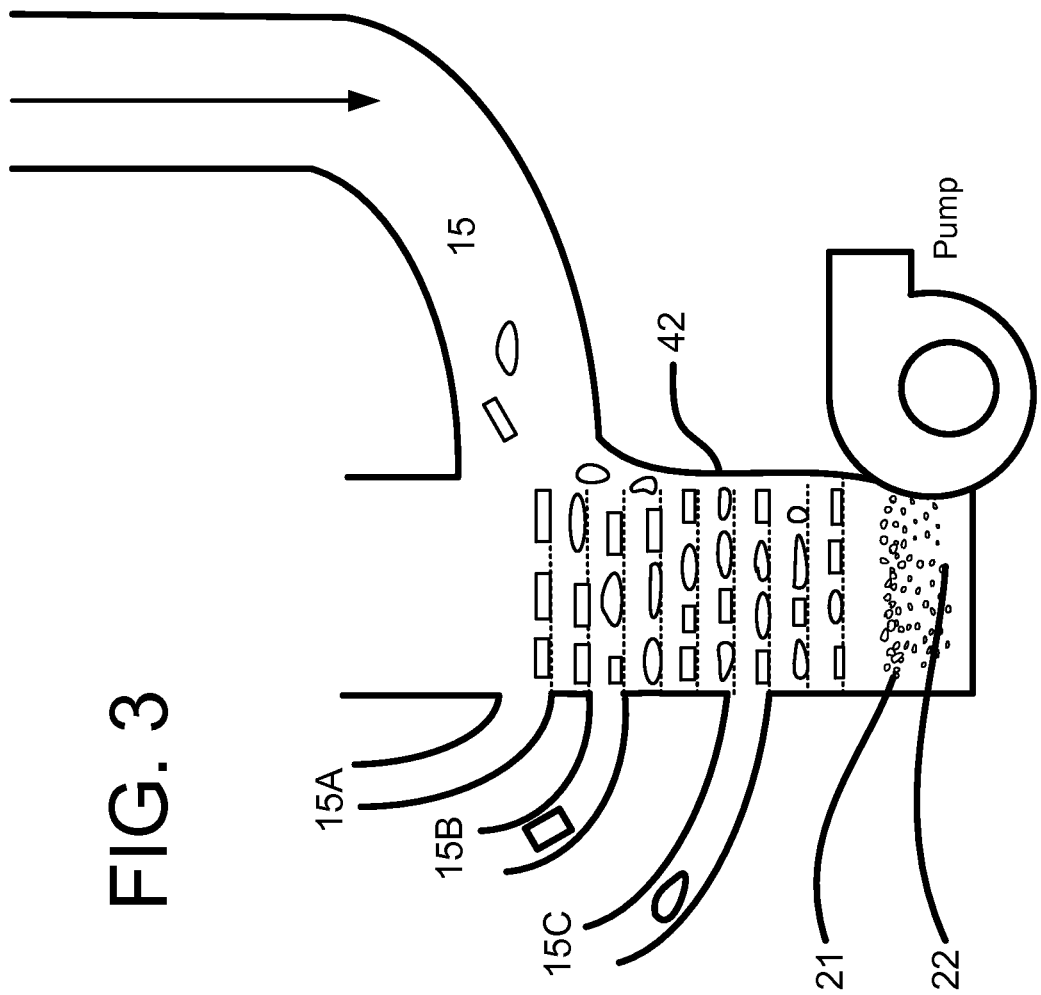

WATER SEPARATION FROM SLUDGE

FIELD OF THE INVENTION

The present invention relates generally to the field of sludge treatment and more specifically to a process of separating water from a mining sludge containing fine particulates.

BACKGROUND OF THE INVENTION

Water is commonly used in mine drilling operations. For example, water is used in tunnel drilling, in hydro excavation, in oil and gas exploration and in dredging operations. Such operations create sludge containing fine particulates that must be disposed of at a very high cost. In some underground mining operations, water may be in short supply due to availability or accessibility conditions.

It would therefore be desirable to provide a process to separate the water from the sludge and to reuse it in subsequent drilling operations. The benefits of such a process include reducing environmental problems created from turbidity and contaminants in the water, reduced costs due to abrasion on pumps, pipes and valves and enabling the recovery of high value minerals from the solids portion of the sludge.

SUMMARY OF THE PRESENT INVENTION

In an aspect of the present invention, a process for separating a sludge stream containing particulate matter into a stream containing predominantly clarified water and a stream containing predominantly particulate matter, the process comprises: providing a source stream containing a particulate sludge; passing the source stream through a solid reagent contactor bed, the solid reagent contactor bed containing a plurality of solid reagent tablets, the solid reagent tablets having a copolymer composition for particle aggregation wherein passing the source stream through the solid reagent contactor bed generates a treated source stream, the passing the source stream through the solid reagent contactor bed causing contact of the source stream and the solid reagent tablets and a gradual dissolution of the solid reagent tablets into the source stream; pumping the treated source stream into a sludge concentrator tank having a top side and a bottom exit side; settling a first stream containing predominantly concentrated particulate matter into the bottom side of the sludge concentrator tank in a manner that a second stream containing predominantly clarified water rises to the top of the sludge concentrator tank; decanting the second stream from the top of the sludge concentrator tank; and removing the first stream from the bottom of the sludge concentrator tank.

These and other features, aspects and advantages of the present invention will become better understood with reference to the following drawings, description and claims.

BRIEF DESCRIPTION OF THE DRAWINGS

FIG. 3 is an illustration of a key component of the process for separating water from sludge according to an embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Figure 1:
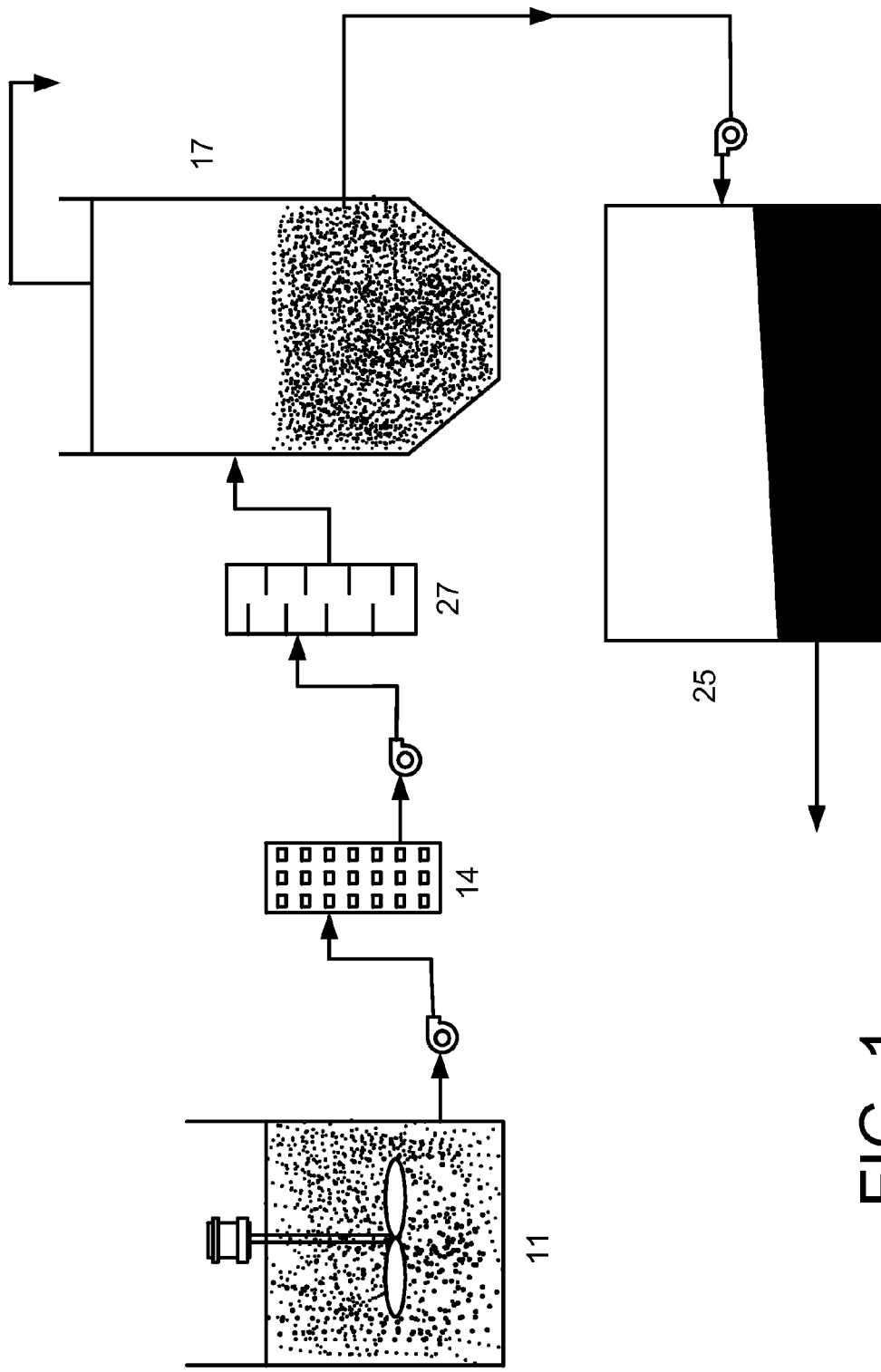
FIG. 1 presents a general flow chart schematic of the process for separating water from sludge according to an embodiment of the present invention.
Figure 2:
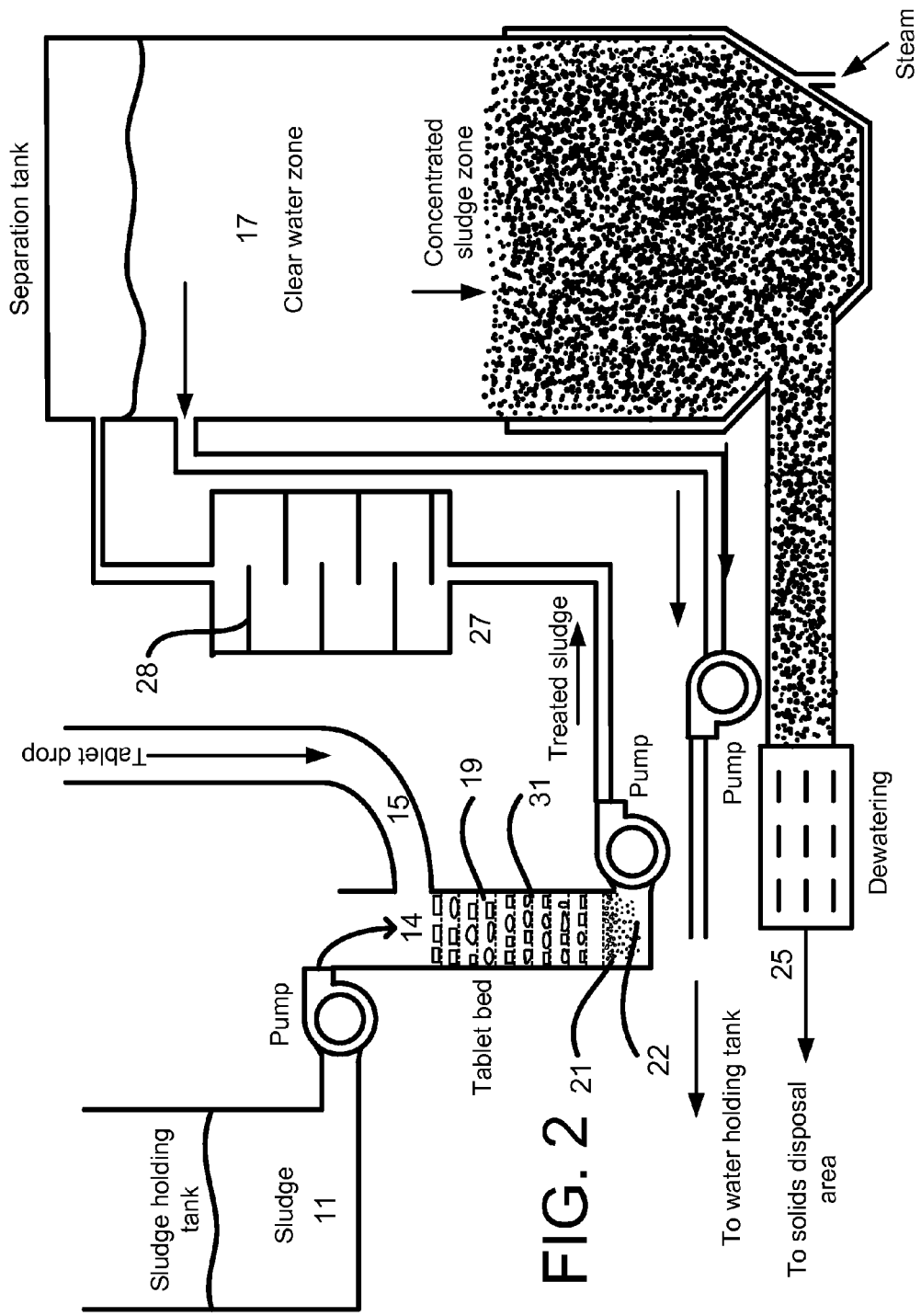
FIG. 2 is a detailed flow chart schematic of the process for separating water from sludge according to an embodiment of the present invention.

FIGS. 1 and 2 show the flow schematic of the process for separating from the sludge a clarified water phase that is substantially free of particulate matter and a solids phase that is substantially water free.

Particulate sludge is collected from a source and conditioned in a holding reservoir 11. The conditioning consists of keeping the density of the sludge uniform by mixing. The conditioned sludge is then pumped with proper velocity from the reservoir 11 into a solid reagent contactor bed 14 containing a plurality of solid reagent tablets or pallets 19.

The slurry is typically at between about 20% to about 30% consistency and comprises of particulate matter typically originating from but not limited to mining operations. The solid reagent tablets 19 may have a circular shape having a diameter of between about 2 inch to about 4 inches and a height of between 0.5 inches and 1.0 inches; however, other spherical pellet shapes as well as more irregular shapes also fall within the scope of the present invention. The solid reagent tablets 19 are made of a composition adapted to dissolve in the slurry and aggregate the particles dispersed in the sludge. The solid reagent tablets 19 are arranged in a bed with some degree of packing to properly utilize the flow space; however the arrangement provides for sufficient space that separates the solid reagent tablets 19 to allow flow through. The lateral clearance between the solid reagent tablets 19 is typically between about 1" to about 4". The solid reagent tablets 19 are also vertically separated in layer form by means of a series of screens or nets 31 that provide support to each layer of solid reagent tablets or pellets 19. The sludge flow passes through the openings in the screens 31 and spaces between the solid reagent tablets 19 while being exposed to the surface of the solid reagent tablets 19 which causes the composition to dissolve into the sludge stream.

After passing through solid reagent contactor bed 14, the flow enters an inline agitation device 27 prior to being pumped into a sludge concentrator tank 17. A number of inline agitation devices fall within the scope of the present invention including, pneumatic, static, such as baffles 28, mechanical and hydraulic. The purpose of the inline agitation is to maintain dispersion of the sludge and prevent premature settling. Other forms of mixing for maintaining dispersion also fall within the scope of the present invention. For example, in-line mixers may be used in the pipes until the treated sludge reaches the sludge concentrator tank 17.

In the sludge concentrator tank 17, a concentrated phase of the sludge separates out from clarified water by settling to the bottom of the sludge concentrator tank 17, while the clarified water rises to the top of the sludge concentrator tank 17.

In the present invention, the flow through the solid reagent contactor bed 14 is adjusted in such a manner that the dissolution rate of the solid reagent tablets 19 into the sludge slurry is between about 0.01% to about 0.5% based on an average volumetric flow through the bed. As the solid reagent tablets 19 or pallets dissolve in the sludge, their size becomes smaller and as the spacing between the solid reagent tablets 19 increases, new solid reagent tablets are introduced to replace the size-diminished solid reagent tablets.

FIG. 3 illustrates a method to accomplish tablet replenishment. The solid reagent tablets 19 may be dropped through channels 15, 15A, 15B and 15C. Additional such channels may be added for each screen level. Another option is a tapered space between solid reagent contactor bed 14 wall 42 and screens 31 through which the solid reagent tablets 19 could be introduced through channel 15 by dropping the solid reagent tablets 19 by gravity such that they slide and arrange onto the screens 31. Providing for means of removing and/or lifting each screen 31 except for the lowest, then dropping pallets on the screen below followed by lowering the screen for the next drop is another way to distribute the pallets and solid reagent tablets 19 on each screen.

The composition from which the solid reagent tablets are made referred to as "Copolymer Composition for Particle Aggregation" is described in U.S. Pat. No. 8,076,391 and is hereby incorporated by reference. Compositions suitable for solid blocks are provided in Examples 16 through 20 of U.S. Pat. No. 8,076,391.

For citation purposes, examples 18-20 are copied below:

EXAMPLE 18

Block Copolymer Composition with Calcium Nitrate 110 grams of very fine bagasse is added to 100 grams of cachaza, and 100 grams of calcium nitrate. This mixture is mixed for 5 minutes until the salts, bagasse, and cachaza are completely homogenized. 40 grams of polyacrylamide and 715 grams of molasses spillage are added to the mixture, and the mixture is again mixed. The final mix is poured into molds and compressed at 400 PSI to form blocks of 400 grams approximately. The final block is left 2 days at 30° C. and 35% relative humidity to dry.

EXAMPLE 19

Block Copolymer Composition with Sodium Silicate 200 grams of water is warmed to more than 95° C. 10 grams of surfactant (alkyl phenol exthoxylate) and 200 grams of sodium silicate is added to the heated water with the surfactant and the mixture is mixed thoroughly. 200 grams of a soap base (75% tallow and 25% of coconut oil) grinded very fine, at a mesh 60 is added. The mixture is again mixed. 100 grams of citric acid are added to the mix of sodium silicate, surfactant, water, and soap. After the water has cooled to below 40° C., 300 grams of polyacrylamide are blended with the mix. The final mix is poured into molds and compressed at 400 PSI to form blocks of 250 grams approximately. The block is left 1 to 2 days at 30° C. and 35% relative humidity to dry.

EXAMPLE 20

Block Copolymer Composition with Calcium Sulfate 200 grams of water is warmed between 50 to 60° C. 10 grams of surfactant (Alkyl phenol exthoxylate and tall fatty acids), 2 grams of lignosulfonate and 200 grams calcium sulfate are added to the warm water. 200 grams of soap base (75% tallow and 25% of coconut oil) grated very fine, at a mesh 60 is added. The soap is mixed with warm water, and calcium sulfate in an electrical mixer. 100 grams of citric acid are added to the mix of calcium sulfate, surfactant, lignosulfonate, water and soap. Finally 300 grams of polyacrylamide are blended with the mix. The final mix is poured into molds and compressed at 400 PSI to form blocks of 250 grams approximately. The block is left 2 days at 30° C. and 35% relative humidity to dry.

In another embodiment of the present invention, the composition of the solid reagent tablets is as follows on a weight basis:
between about 1%-2% anionic starch,
between about 0.1 to 1% cationic starch,
between about 5% to 75% of aluminum chloral hydrate,
between about 5% to about 15% of tallow acid,
between about 5% to about 25% coconut oil soap,
between about 5% to about 82.9% of an anionic polyacrylamide, and
between about 1% to about 5% of sulfonic acid.

The methods for manufacturing the solid blocks are also described in these examples. The solid reagent tablets may be made from the blocks by any suitable size reduction method including but not limited to cutting and grinding. Additionally, the solid reagent tablets 19 may be made by drying the liquid compositions in tablet size molds or pellet shaped molds. Any of the compositions described in these examples is suitable for use in the context of the present invention.

There are a number of advantages of using a solid composition in tablet form compared to a liquid composition. The process of the present invention is likely to be carried out inside the tight space of a mine where transporting barrels of the liquid composition would be challenging. The make-up tank for a liquid composition also requires space that in many locations would likely be in short supply. With a configuration of dropping the solid reagent tablets from outside the mine through chute 15, the space required for solid reagent make-up is saved and the potentially complicated logistics of transporting a concentrated liquid solid reagent into the mine is avoided. Additionally, the need to use a dosing system and a dosing pump is avoided.

The solid reagent tablets 19 are consumed gradually as they dissolve in the sludge slurry passing through spaces between the solid reagent tablets in the solid reagent contactor bed 14. The solid reagent contactor bed 14 must be continuously replenished with fresh solid reagent tablets or pallets as the process is carried out. The tablet replenishment and the more prolonged exposure of the tablet to the sludge at the bottom of the solid reagent contactor bed 14 creates a tablet size gradient as the solid reagent tablets 19 are larger at the feed point and gradually diminish in size to fragments 21 as they approach the exit point 22 from the solid reagent contactor bed 14. When the solid reagent tablets 19 diminish to a size comparable to the openings in the screens 31, they fall to the bottom of the solid reagent contactor bed 14 where and become fully solubilized at the exit of the bed 14. This also creates a viscosity gradient from the top of the bed 14 to the exit point of the solid reagent contactor bed 14 as more of the small and dissolved solid reagent tablets fall to the bottom of the bed 14.

The sludge slurry passing through the solid reagent contactor bed 14 and inline agitation device 27 is pumped into a sludge concentrator tank 17. The purpose of the sludge concentrator tank 17 is to reduce flow velocity in order to allow time for the separation process to take place. A number of commercially available sludge concentrator tank or clarifier configurations such as rectangular, conical and designs including internal baffles are suitable and may be used for this purpose. The particles in the slurry settle to the bottom of the sludge concentrator tank 17 while clarified water stays at the top. It is useful for the sludge concentrator tank 17 to have a tapered or conical bottom. This shape helps concentrate the sludge solids that settle to the bottom. An embodiment of the present invention further includes a filter for the clarified water to improve the clarification process.

Between the inline agitation device 27 and the sludge concentrator tank 17, sufficient piping is provided to allow at least 15 seconds of dwell time for the dissolved reagent composition to disperse and to react with the particles which would then result in the aggregation of the particles and their precipitation.

In an embodiment of the present invention, the sludge in the sludge concentrator tank is heated to a temperature of between about 35° C. and 55° C. This may be accomplished through direct steam into the tank or indirect steam applied to a jacket around the tank. The heat helps the settling process that typically takes no longer than between about 1-2 minutes. The composition dissolved in the slurry also greatly expedites the separation process. The clarified water is decanted for reuse while a concentrated phase of the particles in the original sludge slurry is removed by gravity from the bottom of the sludge concentrator tank 17. A clarified water stream containing less than 0.5% particulate matter and a concentrated sludge stream having a consistency of above 60% are generated.

The concentrated particulate matter removed from the sludge concentrator tank is passed through a further dewatering step that may recover additional useable water from the concentrated sludge. A multi disk press, a screw press as well as other presses may be used in this step. Other dehydration steps labeled in FIGS. 1 and 2 as 25 that fall within the scope of the present invention include: drum drying, filtering through porous fabrics, nets or screens, dehydration sump, chemical drying, draining by gravity, heat drying and ambient drying. The solids from the dehydrator can be achieved by standard solid handling equipment such as loaders, excavators and conveyors.

The particulate matter in the sludge of the present invention constitutes fine particles of the type described in U.S. Pat. No. 8,076,391.

It is noted that the term "contains predominantly" refers to a content of more than 50% in the context of the present invention.

It should be understood, of course, that the foregoing relates to exemplary embodiments of the invention and that modifications may be made without departing from the spirit and scope of the invention.

I claim:

1. A process for separating a sludge stream containing particulate matter into a stream containing predominantly clarified water and a stream containing predominantly particulate matter, said process comprising:

providing a source stream containing a particulate sludge;

passing said source stream through a solid reagent contactor bed having a top and a bottom exit, said solid reagent contactor bed containing a plurality of water soluble solid reagent tablets, said plurality of water soluble solid reagent tablets having a copolymer composition for particle aggregation wherein passing the source stream through the solid reagent contactor bed generates a treated source stream, said solid reagent contactor bed comprising a plurality of screens arranged vertically inside the solid reagent contactor bed, each screen spanning and substantially covering a flow opening of said solid reagent contactor bed, said screens having openings to permit the source stream to flow through said openings, each water soluble solid reagent tablet being placed onto an upper surface of each screen, said screens preventing the plurality of water soluble reagent tablets from falling to the bottom exit of the solid reagent contactor bed until they diminish in size sufficiently through dissolution and fall through the openings in the screens;

said passing the source stream through the solid reagent contactor bed causing contact of the source stream and the plurality of water soluble solid reagent tablets and a gradual dissolution of said plurality of water soluble solid reagent tablets into the source stream;

pumping said treated source stream into a sludge concentrator tank having a top side and a bottom exit side;

settling a first stream containing predominantly concentrated particulate matter into the bottom exit side of the sludge concentrator tank in a manner that a second stream containing predominantly clarified water rises to the top of the sludge concentrator tank;

decanting the second stream from the top of the sludge concentrator tank; and removing the first stream from the bottom exit side of the sludge concentrator tank.

2. The process of claim 1, wherein the solid reagent contactor bed is constituted as a column in a tube from a feed point of the plurality of water soluble solid reagent tablets to the bottom exit of the solid reagent contactor bed, said plurality of water soluble solid reagent tablets entering the solid reagent contactor bed through at least one feed pipe disposed at a side of the solid reagent contactor bed.

3. The process of claim 1 wherein the plurality of water soluble solid reagent tablets gradually dissolve in the source stream through contact with said source stream, wherein an average size of the plurality of water soluble solid reagent tablets gradually diminishes from a feed point of the plurality of water soluble solid reagent tablets to the bottom exit of the solid reagent contactor bed where the plurality of water soluble solid reagent tablets are fully dissolved in the treated source stream.

4. The process of claim 3 wherein the plurality of water soluble solid reagent tablets containing the copolymer composition for particle aggregation are continually fed through the feed pipe in order to replenish dissolved water soluble solid reagent tablets.

5. The process of claim 1 wherein the copolymer composition for particle aggregation comprises:

between about 1%-2% anionic starch,
between about 0.1 to 1% cationic starch,
between about 5% to 75% of aluminum chloral hydrate,
between about 5% to about 15% of tallow acid,
between about 5% to about 25% coconut soap,
between about 5% to about 82.9% of an anionic polyacrylamide, and
between about 1% to about 5% of sulfonic acid.

6. The process of claim 2, further comprising at least one inline agitation device, said inline agitation device being disposed between the solid reagent contactor bed and the sludge concentrator tank, said treated source stream passing through the inline agitation device to maintain a dispersion of the treated source stream.

7. The process of claim 1 wherein a flow through the solid reagent contactor bed is adjusted such that a dissolution rate of the plurality of water soluble solid reagent tablets into the sludge stream is between about 0.01% to about 0.5% based on an average volumetric flow through the solid reagent contactor bed.

8. The process of claim 1 wherein contents of the sludge concentrator tank are heated to a temperature of between about 35° C. and 55° C.

9. The process of claim 1 wherein a bottom of the sludge concentrator tank is downwardly tapered.

10. The process of claim 7, wherein a length of a flow line connecting the inline agitation device and the sludge concentrator tank is sufficient to provide at least 15 seconds of dwell time based on an average volumetric flow of through the flow line.

11. The process of claim 1 further comprising dehydrating the concentrated particulate matter, wherein means for dehydrating the concentrated particulate matter is selected from the steps of pressing, fabric dehydration, drum drying, draining by gravity, ambient drying and heat drying.

12. The process of claim 1, further comprising filtering the second stream to remove residual sludge particles.

13. The process of claim 2 wherein the plurality of water soluble solid reagent tablets containing the copolymer composition for particle aggregation are continually fed onto the screens through side channels positioned at a level of each screen, said side channels going through a side wall of the reagent contactor bed, said plurality of water soluble solid reagent tablets sliding onto the screens by gravity through a tapered section in said side channels.

\* \* \* \* \*